Patented July 18, 1950

2,515,721

UNITED STATES PATENT OFFICE 2,515,721

METHOD OF INCORPORATING SELENIUM IN CADMIUM RED PIGMENTS

Guy C. Marcot, Lynchburg, Va., assignor to American Cyanamid Company, New York, N. Y., a corporation of Maine No Drawing. Application June 28, 1946, Serial No. 680,101

2 Claims. (Cl. 106—301)

This invention relates to the production of pigments and is concerned in particular with a method of preparing a calcinable composite in which the content of sulfur, selenium, tellurium and the like non-wettable materials is controlled in amount and properly dispersed, whereby the composite on calcination yields a pigment of optimum quality. The invention also relates to pigments so produced.

The utilization of the process of the present invention is well illustrated in the production of cadmium red pigments. This term is used to designate any of a variety of calcined products ranging in color from bright orange through the reds to deep maroon and containing both CdS and CdSe. These components appear to form a solid solution in the finished pigment, constituting the principal colored constituent thereof. Control of the color shade is obtained by varying the relative proportion of CdS to CdSe in the solid solution, from about 70-30 for orange to 35-65 for deep maroon. While various shades have been previously obtained by a number of proposed methods, these methods have not been wholly satisfactory and are subject to a number of disadvantages.

In addition to preparing these pigments as "pure" types, i. e., forms in which the solid solution is the principal constituent, they are also commonly prepared as "lithopone" or "extended" types. This is usually done by including a suitable amount of an inert "extender" in the "crude" before calcination in any desired manner, usually by coprecipitation with one or more of the other components. The process of the present invention is readily adapted and its advantages equally applicable to the manufacture of either pure or extended forms.

In the case of cadmium red pigments, for example, the calcinable crudes have been obtained in the past by a number of procedures, each combining a series of procedural steps selected in turn from various proposals. Such procedures may be roughly divided into two general classifications: precipitation of the crude as "compounds" of indefinite structure, usually designated as cadmium sulfo-selenides; and preparation as a mechanical mixture of the components.

Both processes involve the problem of incorporating the correct amount of selenium in such form that the resultant pigment after calcination is of optimum quality. In addition, the selenium should be in such condition as to be as completely utilized as possible. Unfortunately, this problem is complicated by the fact that selenium powder, like powdered sulfur or tellurium, is not water-wettable.

In preparing the sulfo-selenide type of crude a solution of the problem of incorporating selenium is attempted by dissolving elemental selenium in a strong sodium or barium sulfide liquor and carrying out a strike of this liquor and a solution of a soluble cadmium salt. The resultant cadmium-bearing precipitate is used as the crude. This appears to be a quite simple solution. Actually it is not. In order to obtain optimum selenium utilization, the sulfide solution containing the selenium must be carefully controlled as to the extent of ageing and concentration. Otherwise instability results. Therefore positive but troublesome and undesirable limitations are established in the preparation of the cadmium sulfide precipitate when following this method.

In preparing the "mixture" type of crude, cadmium sulfide is separately prepared and then combined, usually in a slurry, with slurries of a cadmium oxide reactant and a selenium reactant, preferably elemental selenium. Preparing a selenium slurry, however, presents considerable difficulty. In both the separate and mixed slurries a part of the selenium powder will float on the surface and a part will be admixed as clusters of unwetted powder. Further, because the selenium powder tends to be coarser than the other materials, it is apt to separate out except from undesirably thick slurries. If such a mixed slurry is dewatered and dried the resultant non-uniform crude will neither produce optimum pigment quality nor optimum utilization of the selenium.

Another procedure, which has been proposed as a solution to the problem without invoking the difficulties of preparing the selenium in sulfide solution, has been to mill the non-wettable material with one of the other reactants. For example, powdered selenium may be ball-milled with a previously prepared cadmium sulfide slurry. This procedure also is not too desirable from a practical point of view. The wet milling operation is both cumbersome and expensive. Again, also, the selenium powder, except at extremely high solids contents, tends to separate from the milled product.

It is therefore a principal object of the present invention to devise a process of incorporating selenium into a calcinable composite without invoking these difficulties. The desired process should not be subject to positive limitations as to ageing and concentration. Neither should it be limited by non-uniformity of admixing nor to the physical handicaps of the wet-milling operations.

The procedure used also should be simple, easily controlled and capable of producing reliably duplicated results.

Surprisingly, in view of the amount of work which has been done on this problem, the desired objects are quite simply and readily attained by pre-wetting the sulfur, selenium or tellurium with a suitable wetting agent. The wetted material can be simply and readily admixed with slurries of the other components of the composite. It is therefore particularly well adapted in the preparation of mixture type crudes. It will be so discussed in illustrating the invention although it is not necessarily limited thereto.

In my copending application, Serial No. 680,098, filed of even date, and now matured into Patent No. 2,496,587, an excellent procedure for preparing and calcining such composite is set forth. In that process individual slurries of a previously prepared cadmium sulfide reactant, a cadmium oxide reactant and a selenium reactant are combined in slurry form. The resultant mixture is dewatered, dried and calcined. It is shown therein that it is essential for best results to maintain a Se:CdO ratio of about 3:2. For purposes of controlling this ratio the present method of incorporating selenium is particularly well adapted.

In general, the type of wetting agent used may be of any desired type. For example, an organic sulfonate, such for example as the commercially-available alkyl-aryl sulfonates, usually containing various extenders, will give excellent results. However, it is generally preferable in calcining pigments that organic material be omitted if possible to do so. Therefore, an inorganic wetting agent such as the sulfides of alkali metal and alkaline-earth metals, are probably preferable. For example, both sodium and barium sulfides may be used to obtain excellent results in making pure and extended types respectively.

In general, the amount of such sulfides used is small. It is not of a comparable order of magnitude in any way with amounts used in conducting the strike with the cadmium salt. Only enough is used to wet the elemental powdered material. A good practice has been found to slurry the selenium or the like at about 50–75% solids content or higher with a dilute sulfide solution. About a 0.25–0.65% sulfide solution is satisfactory, a 0.5% concentration being an excellent general practice.

This procedure may introduce a small amount of sulfur into the composite. Where sulfur is being incorporated this obviously presents no problem. In the incorporation of selenium or tellurium in which the presence of free sulfur during calcination is undesirable, the amount introduced in this way is still substantially negligible. Particularly is this true if the composite is suitably washed before being dewatered and dried.

The process of the present invention, while simple, possesses a number of marked advantages. It provides a ready method of incorporating the material in correct, controlled amounts to accomplish a predetermined effect, something which could not be done in the processes previously used. It results in a uniform dispersion of wetted material in the mixed slurries before dewatering and drying. Therefore the problem of non-uniform dissemination becomes of no importance. Finally and not the least important, because the non-wettable powder is thoroughly dispersed in the composite it is more efficiently utilized. As a result, considerable savings, as much as 5–10%, may frequently be obtained in the amount of such ingredients required to produce a calcined pigment having the desired mass tone and tint thereon. The invention is not limited to the production of any particular shade or color of pigment since it is applicable to any desired quantities within the practical operating range.

The invention will be illustrated in conjunction with the following examples which are meant to be illustrative only and not by way of limitation. All parts are by weight unless otherwise noted.

EXAMPLE 1

*Extended pigment—Light red shade*

A CdS lithopone slurry was formed by a strike of sufficient 1.76 molar $CdSO_4$ liquor and 0.72 molar BaS liquor to precipitate a total of CdS+$BaSO_4$ of about 540 parts which was treated with a 0.03 mol excess of BaS per mol of CdS, with 1.62 parts of $H_3PO_4$, an amount about equivalent to 0.3% of the solids weight, and filtered, the filter cake being washed and repulped to a volume of about 2000 parts. A $CdCO_3$ reactant was prepared by a strike of sufficient 1.76 molar $CdSO_4$ liquor with 1.2 molar solution of $NaHCO_3$ to produce 65.3 parts of $CdCO_3$ which was washed sufficiently to reduce the soluble salts content to about 1.3% of the initial content and repulped to about 435 parts. A Se reactant was prepared by pulping 45.3 parts of powdered Se metal at 50% solids with a 0.5% aqueous BaS solution.

A composite slurry was prepared by adding the Se reactant to the CdS slurry and then adding the $CdCO_3$ slurry, thoroughly mixing the whole and adjusting the total valume to about 2500 parts, and adding about 7 parts of $K_2SO_4$, this being approximately an equi-molecular amount to the soluble sodium salts present. A conductivity test indicated about 0.6% of water-soluble salts on the dewatered pulp suitable for adequate fluxing. This slurry was then dewatered and dried at about 85–95° C.

The dried cake was calcined in an electric muffle furnace in a non-oxidizing atmosphere of $CO_2$ for 15 minutes at temperatures from an initial 1100° F. to a final 1200–1250° F., the calcined pigment being quenched, filtered and dried. The dried pigment was evaluated by mulling the pigment in linseed oil at a pigment content of about 70%. Rubouts of the mixture were taken for examination of the mass tone and tint tone. The shade was an excellent color match for a light red standard and both the mass tone and tint tone rubouts were bright and clean, the tint tone being particularly clean.

EXAMPLE 2

*"Pure" type pigment—Orange shade*

380 parts of CdS were precipitated by a simultaneous strike of 2.35 molar $CdSO_4$ liquor and 1.0 molar $Na_2S$ liquor, the resultant slurry being treated with a 0.05 mol per mol of CdS excess of $Na_2S$, with 3.8 parts of $H_3PO_4$ and an equivalent quantity of $Al_2(SO_4)_3$ and filtered, the filter cake being washed and repulped to about 2000 parts. The $CdCO_3$ reactant was prepared as in Example 1 to obtain 96 parts of $CdCO_3$ slurried to a total volume of 630 parts and the Se reactant was prepared by slurrying 66.5 parts of Se powder at 50% solids in a 0.5% aqueous $Na_2S$ solution.

The Se slurry and the $CdCO_3$ slurry were successively added to the CdS slurry and the whole admixed and adjusted to a total volume of 3500 parts, the remainder being supplemented by adding an amount of $Na_2SO_4$ approximately equal to that already present and then dewatered and dried.

The dried cake was also calcined for about 12 minutes at temperatures from an initial 1050° F. to a final 1250° F. in an inert atmosphere of $CO_2$. Rubout tests in oil for mass tone and tint tone evaluations were prepared. The mass tone of the pigment was both clean and bright and the tint tone excellent. Spectrophotometric curves of the product indicate an excellent match for an orange standard.

EXAMPLE 3

*"Pure" type pigment—Medium red shade*

Example 2 was repeated using 268 parts of CdS in a 2000 parts by volume slurry, the precipitate being treated with 0.5% by weight of $H_3PO_4$ and an equivalent amount of $Al_2(SO_4)_3$. 107 parts of $CdCO_3$ were suspended in a 800 parts by volume slurry having a final salt content of 0.6% that of the initial. 74.4 parts of Se were formed into a 50% solids slurry in 0.5% aqueous $Na_2S$.

The slurries were combined as in Example 2 and washed to a soluble salt content, as equivalents of $Na_2SO_4$, of about 0.2% which was supplemented to a total water-soluble salts content of 1.0% with $K_2SO_4$. The slurry was then dewatered, dried, and calcined over a 10 minute period, from 1000° F.–1250° F. Rubouts of the resultant pigment indicated an excellent color match for a medium red standard being very bright and clean in mass tone and clean in tint tone.

EXAMPLE 4

*"Pure" type pigment—Maroon shade*

Example 2 was repeated using 279 parts of CdS treated with 1% by weight of $H_3PO_4$ and an equivalent weight of $Al_2(SO_4)_3$ in a 2000 parts by volume slurry; a 177 parts of $CdCO_3$ in a 1200 parts by volume slurry and 123 parts of Se powder as a 50% solids pulp in 0.5% aqueous $BaS$. The combined slurries were adjusted to a total volume of 3500 parts and adjusted with $Na_2SO_4$ to produce a filter cake containing 1.0% water-soluble salts. The slurry was dewatered, dried, and calcined over 10 minutes, at from 1200–1350° F. Rubouts of the resultant pigment which possesses a maroon standard shade indicated that the product was excellent in both mass tone and tint tone.

I claim:

1. In a process of producing calcined cadmium pigments in which a composite is prepared by combining a plurality of slurries, at least one of which must contain a powdered non-water-wettable solid, of the right-hand sub-group of the sixth group of the periodic arrangement of the elements, and having an atomic weight greater than 32, dewatering and drying the solids content of the combined slurries and calcining the dried solids; the improvement which comprises adding the non-water-wettable solid as a slurry consisting of 50–75% of the solid in a dilute aqueous solution of a sulfide selected from the group consisting of the alkali metal and alkaline-earth metal sulfides, the sulfide content being equivalent to a 0.25–0.65% by weight solution of sodium sulfide.

2. In a process of producing calcined cadmium pigments in which a composite is prepared by combining a plurality of slurries, at least one of which contains undissolved powdered selenium, dewatering and drying the solids content of the combined slurries and calcining the dried solids; the improvement which comprises adding the selenium as a slurry consisting of 50–75% of powdered selenium in a dilute aqueous solution of a sulfide selected from the group consisting of the alkali metal and alkaline-earth metal sulfides, the sulfide content being equivalent to a 0.25–0.65% by weight solution of sodium sulfide.

GUY C. MARCOT.

REFERENCES CITED

The following references are of record in the file of this patent:

UNITED STATES PATENTS

| Number | Name | Date |
|---|---|---|
| 2,115,080 | O'Brien | Apr. 26, 1938 |
| 2,248,408 | Juredine | July 8, 1941 |
| 2,296,066 | Sloan | Sept. 15, 1942 |

OTHER REFERENCES

"Protective and Decorative Coatings," vol. II, p. 9.